United States Patent [19]
Rhoades

[11] Patent Number: 6,136,247
[45] Date of Patent: Oct. 24, 2000

[54] METHOD OF FORMING A HEADED THERMOPLASTIC TUBE

[75] Inventor: John J. Rhoades, Poplar Grove, Ill.

[73] Assignee: Thatcher Tubes LLC, Woodstock, Ill.

[21] Appl. No.: 09/199,695

[22] Filed: Nov. 25, 1998

[51] Int. Cl.[7] ............................ B29C 43/02; B29C 57/00; B29C 61/08
[52] U.S. Cl. ............................ 264/230; 264/296; 264/310; 264/322; 264/519; 425/393; 425/402; 425/403
[58] Field of Search ........................... 264/230, 310, 264/322, 327, 296, 519; 425/392, 393, 402, 403

[56] References Cited

U.S. PATENT DOCUMENTS

| | | | |
|---|---|---|---|
| 3,047,910 | 8/1962 | Downs | 18/59 |
| 3,226,464 | 12/1965 | Saumsiegle et al. | 264/325 |
| 4,032,281 | 6/1977 | Rakovsky | 425/392 |
| 4,123,312 | 10/1978 | Schmid et al. | 156/466 |
| 4,424,182 | 1/1984 | Cerny | 264/138 |
| 5,069,856 | 12/1991 | Holoubek et al. | 264/519 |
| 5,322,658 | 6/1994 | Holoubek et al. | 264/150 |

*Primary Examiner*—Jan H. Silbaugh
*Assistant Examiner*—Michael I. Poe
*Attorney, Agent, or Firm*—Armstrong, Westerman, Hattori, McLeland & Naughton

[57] ABSTRACT

A headed thermoplastic tube is formed solely from a thermoplastic extruded, stretched, sleeve by positioning the sleeve over a forming mandrel so the sleeve has an exposed portion. While rotating the forming mandrel which holds the sleeve, the inner surface of the exposed portion of the sleeve is heated above the glass transition temperature of the thermoplastic material to render the inner surface molten while the outer surface provides support for the exposed portion of the sleeve. The heated exposed portion is then shaped into a conical shape, such as by heating the outer surface, the rotation of the mandrel is stopped and pressure applied to the conical shaped exposed portion to form a headed thermoplastic tube. The headed tubes produced have a body portion, shoulder portion and neck portion, without any seams, all of which are formed from the starting thermoplastic extruded, stretched sleeve.

9 Claims, 5 Drawing Sheets

METHOD OF FORMING A HEADED THERMOPLASTIC TUBE

FIELD OF THE INVENTION

The present invention relates to a method of forming headed thermoplastic tubes solely from an extruded thermoplastic sleeve without use of any additional thermoplastic material.

BACKGROUND OF THE INVENTION

Thermoplastic tubes that are formed as squeeze tubes are extensively used in packaging of cosmetics, toothpaste, shampoos, and the like. These tubes are formed as tubular members having an open end at a first end and a threaded or other closure-acceptable head at the second end, with a closure used to seal the second end of the tube while the contents of the tube are charged to the tube through the first end. After filling, the first end of the tube is closed, such as by heat sealing, to complete the filled tube for sale.

A problem has existed in formation of such tubes in that the closure-acceptable head is usually formed separately from the tubular member and the provision of a complete seal between the head and tubular member must be assured.

One well known commercial method for producing such headed tubes is that disclosed in U.S. Pat. No. 3,047,910 to M. H. Downs. In this process, a tubular member is placed in a forming collar and a separate molten disc of thermoplastic material is forced into an open end of the tubular member while retained by the forming collar. The latent heat of the molten disc welds the peripheral edge of the disc to the inner circumferential wall of the tubular member and forms an end closure for the tubular member. Pressure is applied to the hot sealed end closure to shape a head into a desired shape and an orifice is then formed through the end of the closure. The head is then fitted with a threaded cap or other closure to provide a closed end tube ready for filling with the desired contents for the tube.

In methods such as that disclosed by the Downs patent, some difficulties remain, such as controlling the thickness and weight of the head and exact color matching of the tubular member and the head. The Downs process is not suitable for commercially preparing tubes from polycarbonates and polyvinyl chloride material. Also, any time two separate units such as a tubular member and a head are combined, a possible source of weakness exists at the juncture of the two. In addition, with such a juncture, a joint between the tubular member and head, a problem of providing a continuous barrier container is present where the tube contains a barrier material, such as an oxygen-barrier containing composite thermoplastic material.

There have been attempts in the past to produce thermoplastic squeeze tubes by extruding a thermoplastic tubing, cutting the tubing into sleeves or tubular members, heating one end of the sleeve to a molten mass and forming it into a head to make the thermoplastic tube. These methods have not been commercially successful because heat transfer is slow and the molten plastic is difficult to control. In such attempts, a sufficient amount of molten thermoplastic material is not accumulated on the end of the sleeve to form the desired head.

Forming headed thermoplastic tubes from thermoplastic extruded, longitudinally stretched sleeves has worked due in part to the workability of thermoplastic material when it is heated after having been extruded and longitudinally stretched. Such a process is described in U.S. Pat. No. 5,069,856, assigned to the assignee of the present invention and the contents of which are incorporated herein. The process employs the steps of heating a portion of a thermoplastic extruded, longitudinally stretched sleeve by a heat source inserted into an open end of the sleeve to a temperature above the glass transition temperature, which causes die swelling (longitudinal shrinking and thickening) of the thermoplastic material and then applying pressure on the heated end of the sleeve by contacting the heated end with a molding die to form a headed thermoplastic tube.

The above process may be improved by the process of the present invention. Therefore it is an object of the present invention to provide an improved method for manufacturing headed thermoplastic tubes.

It is another object of the present invention to provide a method for forming a headed thermoplastic tube solely from a sleeve or tubular member.

It is a further object of the present invention to manufacture a thermoplastic tube having a head portion that does not have any joint or juncture between the tubular portion of the tube and the head portion thereof.

SUMMARY OF THE INVENTION

A method of forming a headed thermoplastic tube from an thermoplastic extruded, longitudinally stretched sleeve is provided by positioning the sleeve over a forming mandrel with an exposed portion of the sleeve extending beyond a head forming end of the mandrel. The mandrel is then rotated while the sleeve is heated. The rotation provides for even heat distribution at the location where the heat is applied.

The inner wall surface of the exposed portion of the thermoplastic sleeve is heated to a temperature above the glass transition temperature of the thermoplastic material to render the inner surface area molten, such as by use of a blast of hot air directed against the inner wall surface, while maintaining the outer surface of the sleeve below the glass transition temperature so as to provide support for the exposed portion of the sleeve and substantially retain the shape thereof.

The heated exposed portion is then shaped into a conical shape, such as by directing hot air against the outer surface thereof. The rotation of the sleeve is stopped and pressure is then applied to the conical-shaped, exposed portion of the thermoplastic, extruded sleeve by contacting the exposed portion with a molding die to form a headed thermoplastic tube. The pressure applied to the conical shaped exposed end portion is preferably by forcing the same into an abutting molding die by use of the head forming end on the mandrel.

The thermoplastic extruded, longitudinally stretched sleeve may be formed from a single thermoplastic material or the sleeve may be formed from a laminate or composite of a plurality of layers of materials, one layer of which may be an oxygen-impermeable material.

The tubes of the method of the present invention are formed solely from a thermoplastic extruded, stretched sleeve and have a tube body, shoulder and neck, all of which are comprised of the thermoplastic material from which the sleeve was formed, the tubes having no seams or joints present throughout the tube.

BRIEF DESCRIPTION OF THE DRAWINGS

The present method will now be explained with reference to the accompanying drawings wherein like numerals indicate like parts throughout the drawings, and wherein.

DETAILED DESCRIPTION OF THE INVENTION

The headed thermoplastic tubes produced according to the present method can be formed from various thermoplastic materials. Such thermoplastic materials include, but are not limited to, high density polyethylene, low density polyethylene, polypropylene, a polyester such as polyethylene terephthalate, polycarbonates, polyvinyl chloride, and the like.

The headed thermoplastic tubes may also be formed from multi layers or laminates of various plastic materials, such as a layer of an oxygen-impermeable material comprising a polyamide such as nylon, or ethylene polyvinyl alcohol, a polyvinylidene chloride or the like sandwiched between two polyethylene outer layers. Also, five layer composites comprising an outer layer and an inner layer of a thermoplastic such as polyethylene, polypropylene, a polyester such as polyethylene terephthalate, an intermediate layer of an oxygen-impermeable material, and adhesive layers between the oxygen-impermeable material and the outer and inner layers of thermoplastic to bond the same, can be used to form thermoplastic headed tubes according to the present method.

The thermoplastic headed tubes are formed from a flexible material and are readily squeezable and collapsible to force the contents of the tube out of an orifice formed in the end of the tube at the head portion. They are generally of a size having a wall thickness of the sleeve portion of between about 0.010 to 0.040 inch in thickness, while a shoulder and a neck portion of the tube will be thicker than the wall of the sleeve, generally between 0.035 to 0.045 inch thick. Since the tube is formed from an extruded sleeve, the wall thickness of the sleeve portion will be very uniform, with a variance in wall thickness of the sleeve portion being only about + or −10 percent.

The extruded sleeve from which the headed thermoplastic tube is formed is a sleeve cut from an extrusion which has a wall thickness in the molten state preferably two to three times the wall thickness of the final cooled extruded thickness. The extrusion from which the sleeve is cut can be of any shape. Consequently, the sleeve cut from the extrusion can take the shape of the extrusion like cylindrical, oval, elliptical, rectangular or any other shape. The shape of the sleeve used in the present invention is typically cylindrical. Such a tubular extrusion, as is known, is formed by extruding thermoplastic material from an extrusion annulus in a molten state and stretching the hot tubular form, in the direction of the longitudinal axis, into a tube or sleeve having a wall thickness one-half (½), one-third (⅓), or less, than the extrusion annulus. Such a stretch oriented extruded sleeve, when heated above the glass transition temperature of the thermoplastic material, due to the plastic memory of the thermoplastic material, will increase in thickness to the thickness of the molten material exiting the extrusion annulus, and shrink in length, thus providing sufficient molten plastic mass to form a head on the sleeve according to the present method. When using high density polyethylene (HDPE) or low density polyethylene (LDPE), for example, the annulus would extrude a tubular form of about 1.5 inch in diameter having a wall thickness between about 0.040–0.046 inch, which would be stretched into a stretch oriented extruded sleeve of about 1.0 inch in diameter having a wall thickness between about 0.015–0.018 inch.

Figure 1:
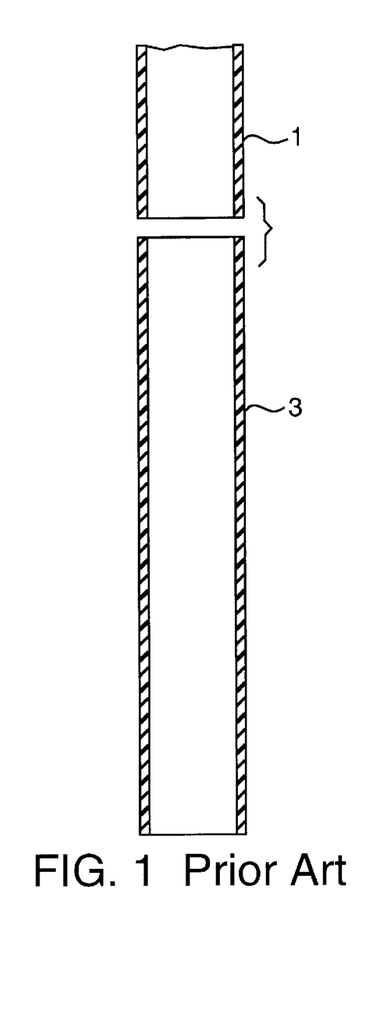
FIG. 1 illustrates, in cross-section, a thermoplastic extruded, stretched sleeve from which the method of the present invention forms a headed thermoplastic tube.
Figure 2:
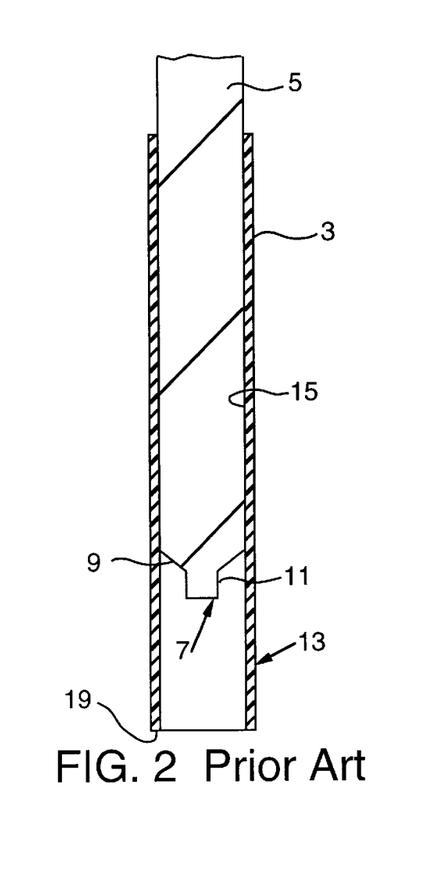
FIG. 2 illustrates the thermoplastic extruded, stretched, sleeve of FIG. 1 supported on a forming mandrel having a head forming end.

Referring now to the drawings, FIG. 1 shows a thermoplastic extruded, stretched extrusion 1 from which a thermoplastic extruded, stretched sleeve 3 is cut. In the preferable embodiment, the extrusion 1 is extruded and longitudinally stretched. The thermoplastic extruded, stretched sleeve 3 is disposed on a forming mandrel 5 that has a head forming end 7 formed of a shoulder 9 and a reduced diameter portion 11, with an exposed portion 13 of the thermoplastic extruded, stretched sleeve 3 extending beyond the head forming end 7 of the forming mandrel 5 (FIG. 2). The thermoplastic extruded, stretched sleeve 3 is frictionally held on the forming mandrel 5, with only a small clearance, such as about a 0.005 inch clearance, which maintains the sleeve in place, while preventing subsequent flow of hot fluid between the forming mandrel 5 and an inner wall surface 15 of the thermoplastic extruded, stretched sleeve 3.

Figure 3:
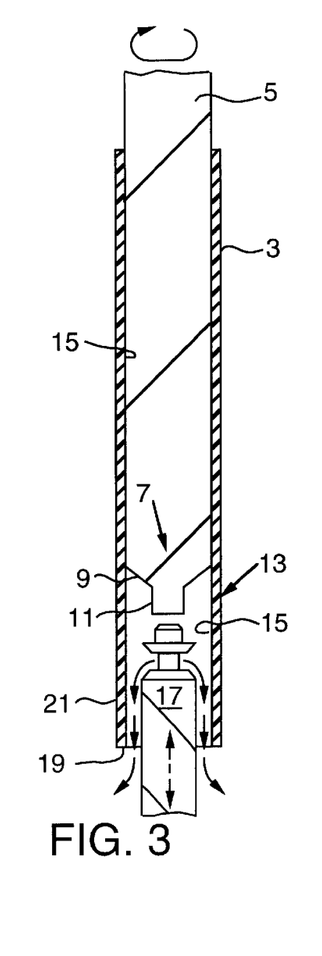
FIG. 3 illustrates heating of the exposed inner wall surface of the exposed portion of the thermoplastic extruded, stretched, horizontally disposed sleeve by a hot fluid while rotating the sleeve, as shown by the arrow.

With the thermoplastic extruded, stretched sleeve 3 disposed on forming mandrel 5, the inner wall surface 15 of the exposed portion 13 is heated by use of a heat source inserted into an open end 19 of the exposed portion 13 of sleeve 3, such as by impingement thereon of a hot fluid illustrated by the arrows in FIG. 3, such as air, from a hot air nozzle 17 which is sized so as to permit insertion thereof into the open end 19 of the exposed portion 13. The hot air is directed outwardly towards the inner wall surface 15 and flows away from the head forming end 7 of the unheated forming mandrel 5.

Figure 4:
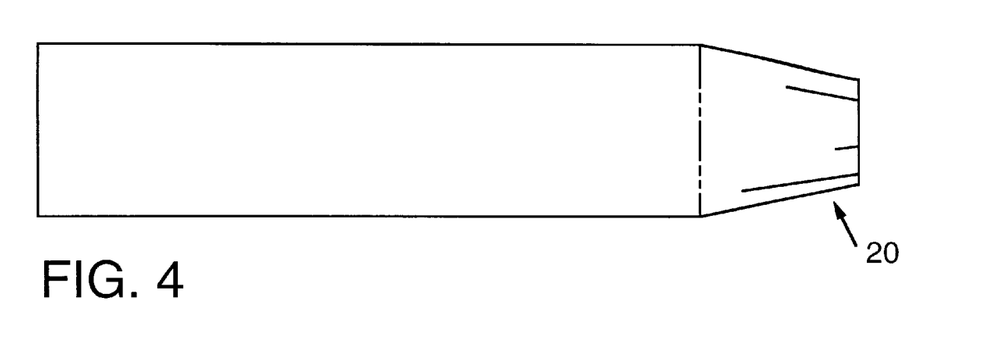
FIG. 4 illustrates a bullet-shaped preform mass.

Forming mandrel 5 is rotated in order to rotate sleeve 3 during the application of heat. The rotation step provides several advantages. Rotating sleeve 3 while heating the inside of sleeve 3 and maintaining an outer surface 21 below the glass transition temperature of the thermoplastic, draws the heated plastic of exposed portion 13 into a bullet-shaped preform 20, as in FIG. 4. A preform mass that is formed and remains in front of the unheated portion of sleeve 3, completely within the cross-sectional area of sleeve 3, is a better preform to mold into a head because no overlap or flash is created on the finished head. If heated thermoplastic is not controlled it may take a shape which expands beyond the cross-sectional area of a mold die; thus when placed into a die, the thermoplastic can be partially pressed out of the die and overlap onto itself. This creates defects on the finished tube head which are undesirable.

Figure 5:
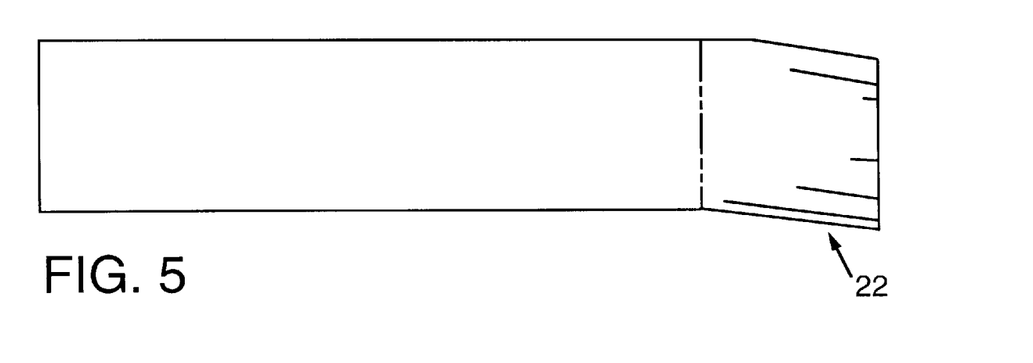
FIG. 5 illustrates a droop-shaped preform mass.

If larger diameter sleeves 3 are heated in the horizontal position without rotating, the preform mass created from exposed portion 13 can sag and may collapse under the natural weight of the thermoplastic material. The result is a droop-shaped preform 22, as in FIG. 5, which is undesirable for manufacturing. If a droop-shaped preform 22 contacts a mold die, some of the heated preform may bend backward onto sleeve 3 creating an overlap of material on sleeve 3 which creates a surface defect or indent on the formed tube. The overlapped material may create a lump of extra material or flash on the surface of the finished tube which is also undesirable.

Figure 6:
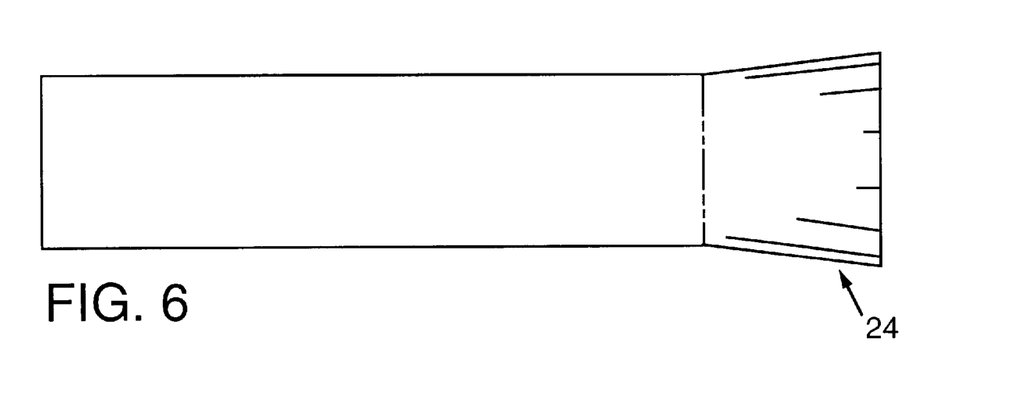
FIG. 6 illustrates a flare-shaped preform mass.

A flare-shaped preform 24, as in FIG. 6, can result, for example, if hot air from a heating element impinges on inner wall surface 15 of exposed portion 13 causing the thermoplastic to expand or flare in all directions. The flare-shaped preform 24 is undesirable because it is difficult to control and often leads to overlap or flash defects. Rotation provides control over the heated preform shape of exposed portion 13 prior to molding which leads to control over tube surface appearance.

Rotating or spinning sleeve 3 has the advantage of lessening the effect of gravity on the thermoplastic molten preform of exposed portion 13 if mandrel 5 is horizontal. (FIG. 3). For example, especially for larger diameter sleeves 3 of a size such as a, 2 inch, 1½ inch, 1⅜ inch and 1³⁄₁₆ inch diameter, the centrifugal forces of the rotation will lessen the effect of exposed portion 13 to sag due to gravity. Centrifugal forces will pull the molten material outward resulting in the bullet-shaped preform 20 of FIG. 4. Gravitational force can be negated or limited by the centrifugal force applied to the thermoplastic sleeve. Rotating the sleeve constantly changes the direction of forces acting on any specific section of the sleeve thereby cancelling the effect of gravity on that section and thus the entire sleeve.

Besides control over the preform mass, rotating provides even heat distribution in the exposed portion 13. An even temperature distribution and controlled preform shape are good manufacturing conditions for consistently creating high quality molded heads without overlap or flash defects. Previously these defects were harder to control. The rotation step may be used with thermoplastic sleeves of all sizes, such as ½, ⅝, ¾, ⅞, 1, 1³⁄₁₆, 1⅜, 1½ and 2 inches.

Furthermore, because of even heat distribution, higher temperatures may be used without burning the plastic of sleeve 3. The use of higher temperatures decreases the heating time necessary to reach the glass transition temperature in exposed end 13 of sleeve 3.

Forming mandrel 5 is typically rotated in the range of 30–90 revolutions per minute (rpm). With the rotation of forming mandrel 5, the heating temperature may be increased 10 to 15%. For example, the thermoplastic sleeve 3 is currently heated in a temperature range of 600° F. to 750° F., depending on the thermoplastic material used. This temperature range may be increased by 10 to 15%, to a range of 660° F. to 863° F., if forming mandrel 5 is rotated during heating. One advantage of this temperature increase is the reduction of time necessary to heat the thermoplastic material which may mean a reduction in total manufacturing time as well.

The hot air nozzle 17 and forming mandrel 5 are reciprocally associated so that the hot air nozzle 17 can be disposed in and removed from the exposed portion 13 of the thermoplastic extruded, stretched sleeve 3. The hot air nozzle 17 is shown as reciprocally movable, indicated by the dashed arrow in FIG. 3, while alternately the same can be fixed and forming mandrel 5 can be reciprocally movable.

The hot fluid heats the inner wall surface 15 of the exposed portion 13 to a temperature above the glass transition temperature of the thermoplastic material and melts inner wall surface 15, while an outer surface 21 of the exposed portion 13 provides sufficient support to maintain the exposed portion 13 as a substantially cylindrical shape. When sufficient heat has been applied to the inner wall surface 15 of the exposed portion 13 to melt the same, the hot air nozzle 17 is removed from the exposed portion and the heated exposed portion 13 is shaped into a conical or fluted cone shape 25, such as by the application of additional heat of further hot fluid, indicated by arrows in FIG. 7. Additional hot fluid may be, for example, hot air from external hot air nozzles 23, which heats the outer surface 21 of the exposed portion 13 of the thermoplastic extruded, stretched sleeve 3. Outer surface 21 is heated to a temperature above the glass transition temperature of the thermoplastic material whereby it melts rendering outer surface 21 into a moldable state.

While heating of the outer surface 21 by a hot fluid may be used to form the conical shape 25, it is also possible to continue the heating of the inner wall surface 15 of the exposed portion 13 until the outer surface 21 no longer maintains the substantially cylindrical shape, such that the conical shape 25 results in the exposed portion 13. Forming mandrel 5 may be rotated continuously during the entire heating process, as indicated by the arrows in FIGS. 3 and 7. Because the thermoplastic extruded sleeve 3 is a stretched material, when the exposed portion 13 is heated above the glass transition temperature, the plastic memory responds and the exposed portion 13 swells to a thickness of or substantially the thickness of the tubular extrusion thickness, generally about two to three times the wall thickness of the thermoplastic extruded, stretched, sleeve 3. The hot exposed portion 13, when above the glass transition temperature in addition to swelling in wall thickness, shrinks in the direction of the axis of the sleeve and provides a mass of moldable thermoplastic material 27 for the forming of a head.

Figure 9:
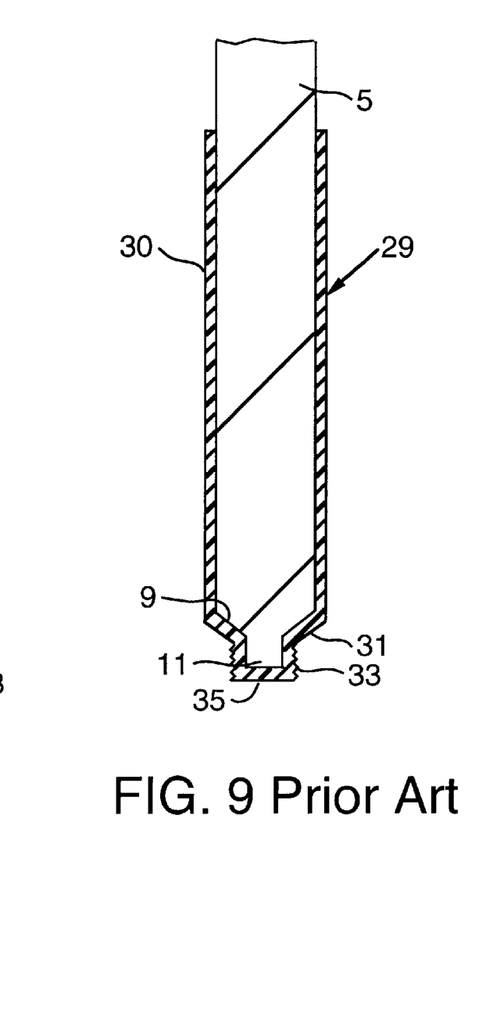
FIG. 9 illustrates a finished headed thermoplastic tube on the forming mandrel prior to release therefrom.

After shaping of the heated exposed portion 13 of the thermoplastic extruded stretched, sleeve 3 into the conical shape 25, the rotation of forming mandrel 5 is stopped and pressure is applied on the exposed portion 13 through the head forming end 7 of the forming mandrel 5 to form a headed thermoplastic tube 29 which comprises a body portion 30, a shoulder portion 31 and a neck portion 33 having a closed end 35 to close the end of the sleeve 3, illustrated in FIG. 9. The forming of a head on thermoplastic tube 29 is carried out by applying pressure to the conical shaped portion 25 which includes the mass of moldable thermoplastic material 27. Sufficient force or pressure may be applied by use of the head forming end 7 of the forming mandrel 5 and an abutting die 37. As illustrated, the die 37 may have a shoulder forming portion 39, a neck forming section 41, and a closed end forming section 43 which are retained in separable mold sections 45 and 47.

While the forming mandrel 5 is illustrated, by an arrow, as being reciprocal to form the conical shaped portion 25 on the forming mandrel 5 into the abutting die 37, the forming mandrel 5 could be fixed and the abutting die 37 reciprocated to cause application of pressure and formation of the headed thermoplastic tube 29.

Figure 10:
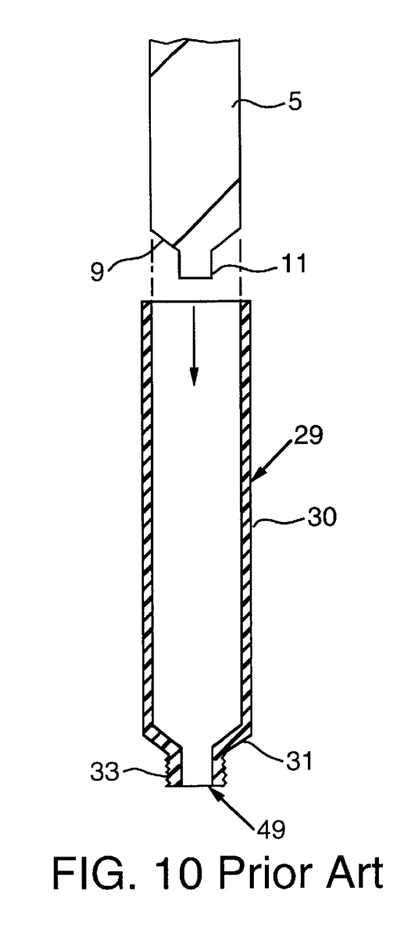
FIG. 10 illustrates the finished headed thermoplastic tube released from the forming mandrel.

FIG. 9 illustrates the formed headed thermoplastic tube 29 after removal of the headed portion from die 37 and still retained on forming mandrel 5. FIG. 10 shows the stripping or unloading of the finished headed thermoplastic tube 29 from forming mandrel 5 for finishing or use. As is conventional, the closed end 35 of the thermoplastic headed tube is subsequently punctured to form an orifice 49 therethrough.

Figure 11:
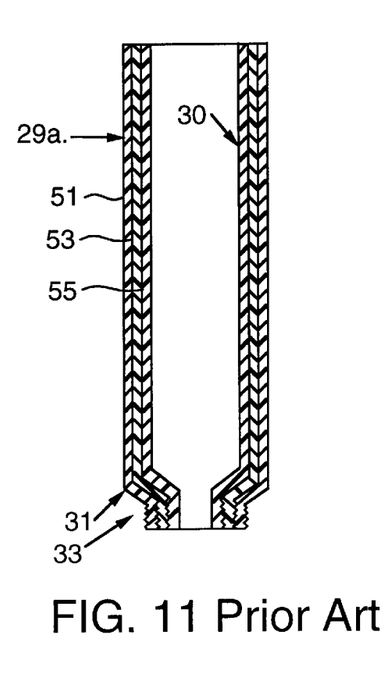
FIG. 11 illustrates a finished headed thermoplastic tube formed by the present method from a multi-layer thermoplastic extruded, stretched sleeve having three layers.

The thermoplastic headed tubes formed by the present method are tubes which have no seams or joints between the various portions. As shown in FIG. 10, the thermoplastic headed tube 29 has body portion 30, shoulder portion 31 and neck portion 33, all of which are comprised of the thermoplastic material that the thermoplastic extruded, stretched, sleeve 3 was formed, and there are no seams or joints present throughout the entire tube. The thermoplastic headed tube, as hereinbefore described, may be formed from a single thermoplastic material or a laminate comprised of multi-layers of thermoplastic materials, at least one of which may be an oxygen-impermeable material. FIG. 11 for example, illustrates a multi-layer thermoplastic headed tube 29*a* as would be produced according to the present method, having three layers, an outer layer 51, an intermediate layer 53 and an inner layer 55, where the outer and inner layers 51 and 55 are formed of a different thermoplastic material than the intermediate layer 53. For example, the outer and inner layers 51 and 55 can comprise polyethylene while the intermediate layer 53 would by an oxygen-impermeable layer, such as a polyamide such as nylon, or ethylene polyvinyl alcohol, a polyvinylidene chloride, or the like.

Figure 12:
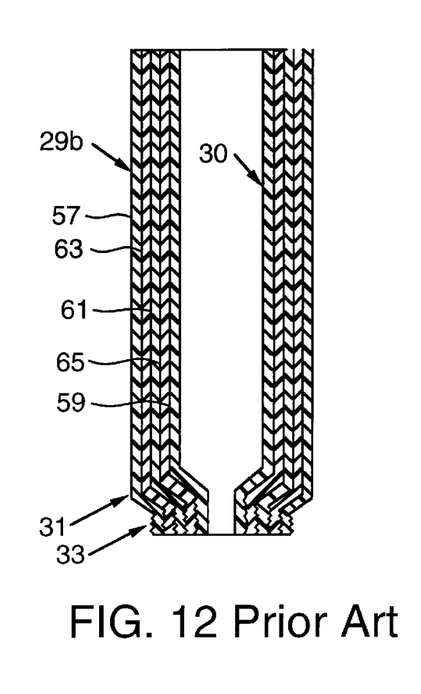
FIG. 12 illustrates a finished headed thermoplastic tube formed by the present method from a multi-layer thermoplastic extruded, stretched sleeve having five layers.

FIG. 12 illustrates a multi-layer thermoplastic headed tube 29*b* as would be prepared using the present method, having five layers, an outer layer 57, an inner layer 59, an intermediate impermeable layer 61, and two adhesive layers 63 and 65, one of the layers of adhesive provided between the intermediate layer 61 and each of the outer and inner layers 57 and 59. Such a tube could, for example, use polyethylene, polypropylene, or a polyester such as polyethylene terephthalate as the outer and inner layers 57 and 59, an oxygen-impermeable material such as nylon, ethylene polyvinyl alcohol, polyvinylidene chloride, as the intermediate layer 61, and adhesive layers 63 and 65 to bond the outer and inner layers 57 and 59 to the intermediate layer 61.

Figure 13:
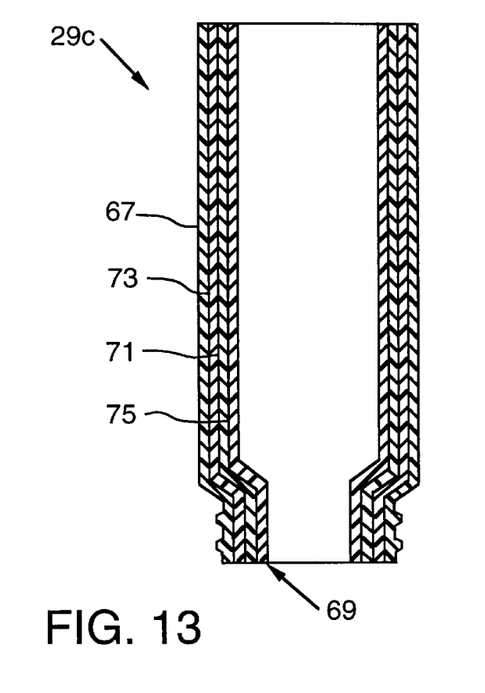
FIG. 13 illustrates a finished headed thermoplastic tube formed by the present method from a multi-layer thermoplastic extruded, stretched sleeve having five layers with the inner layer being thicker than the outer layer.

FIG. 13 illustrates another multi-layer thermoplastic headed tube 29*c* as can be prepared by using the present method, having five layers, an outer layer 67, inner layer 69, intermediate impermeable layer 71, and two adhesive layers 73 and 75, one of the layers of adhesive provided between intermediate layer 71 and each of the outer and inner layers 67 and 69. The materials of the layers may be the same as that described for FIG. 12. Tube 29*c* has a unique structure, however, in that inner layer 69 is 1.5 to 3 times thicker than outer layer 67. For example, outer layer 67 may be between 0.004 and 0.006 inches thick and inner layer 69 would be between 0.010 and 0.012 inches thick. In FIG. 13, inner layer 69 is shown as two times as thick as outer layer 67. The structure with an inner layer 1.5 to 3 times thicker than an outer layer may be possible, for any multi-layer thermoplastic tube.

Figure 14:
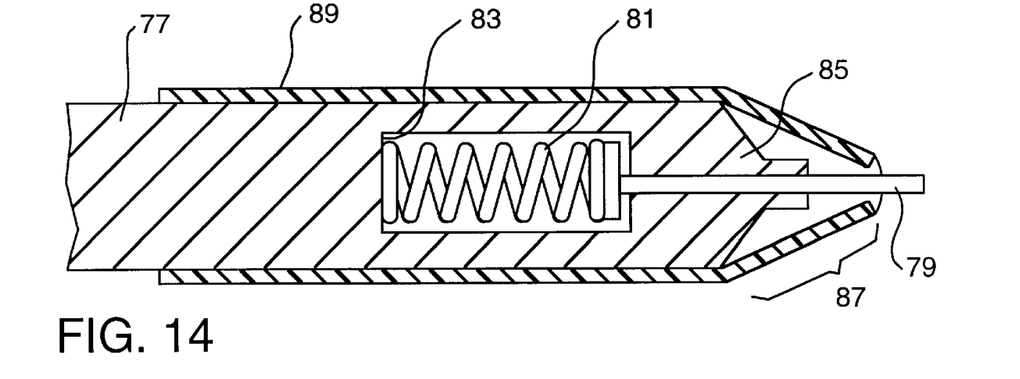
FIG. 14 illustrates a thermoplastic sleeve on a forming mandrel, the mandrel having an orifice forming pin.

FIG. 14 illustrates an alternate method for forming an orifice in a thermoplastic tube during the manufacturing process. Forming mandrel 77 having a spring loaded pin 79 housed in the body of forming mandrel 77 may be used in the same process steps as illustrated in FIGS. 2–7. Spring loaded pin 79 is slidably mounted inside forming mandrel 77 such that one end of spring loaded pin 79 is free and the other end contacts a spring 81 which can be expanded and compressed. Spring 81 contacts spring loaded pin 79 at one end and a support surface 83 at an opposite end.

Figure 7:
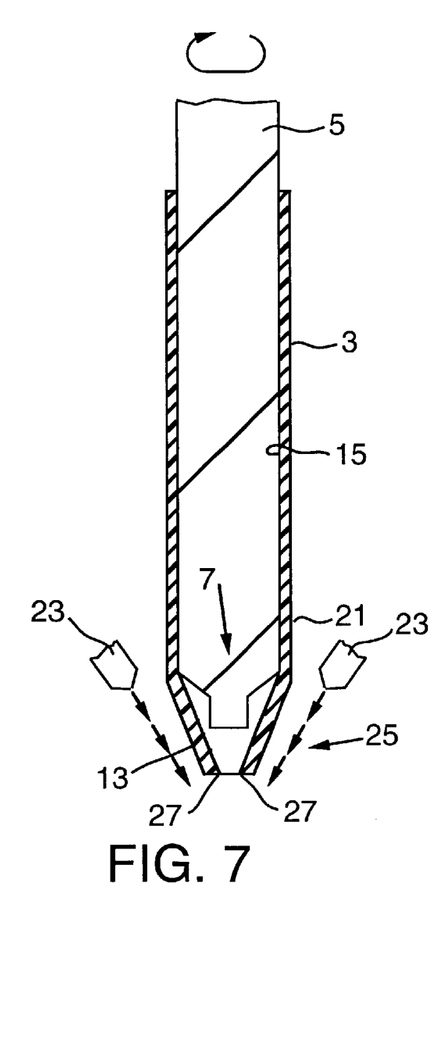
FIG. 7 illustrates the shaping of the heated exposed portion of the thermoplastic extruded horizontally disposed sleeve into a conical shape while rotating the sleeve, as shown by the arrow.
Figure 8:
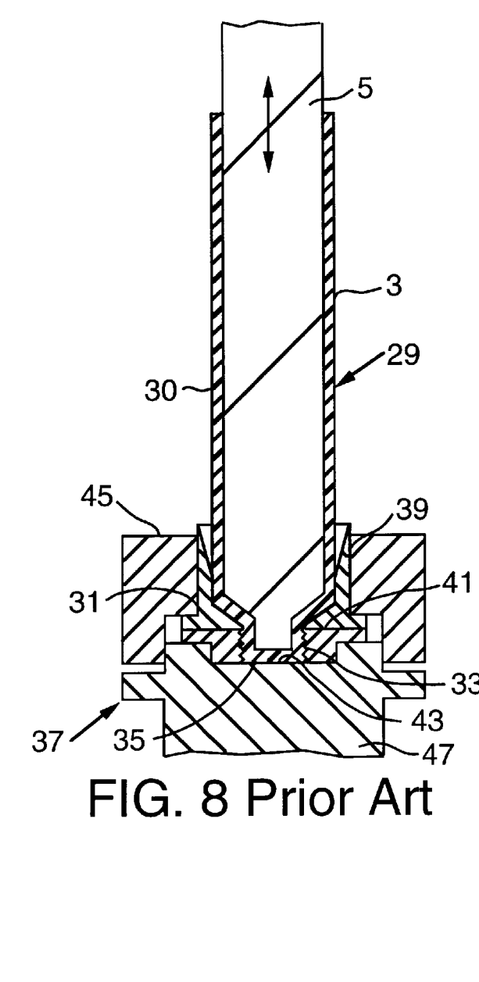
FIG. 8 illustrates pressure being applied to the conical shaped exposed portion of the thermoplastic extruded sleeve and contact with an abutting die to form a head.

During the steps illustrated in FIGS. 2, 3 and 7, spring loaded pin 79 extends beyond head forming end 85 of forming mandrel 77, as illustrated in FIG. 14, to provide a structure around which thermoplastic material 87 of thermoplastic sleeve 89 forms. When forming mandrel 77 is inserted into an abutting molding die like die 37 of FIG. 8 for forming a headed end on thermoplastic sleeve 89, spring loaded pin 79 is compressed into forming mandrel 77 leaving only a small portion of spring loaded pin 79 extended to contact the molding die. When the die is removed, spring loaded pin 79 expands again. The headed end of thermoplastic sleeve 89 will have an orifice because spring loaded pin 79 prevented the formation of a solid headed end. This method of manufacture conserves material and eliminates the additional step of punching an orifice in a finished thermoplastic tube.

The improved method of making thermoplastic tubes, the method which includes a spinning step, is very appropriate for making tubes having a polyethylene inner layer, for example, thicker than a polyethylene outer layer. Because of the thicker inner layer, more energy will be required to bring the temperature of the inner layer above the glass transition temperature. But, by spinning the sleeve while heating it from the inside, heat will be evenly distributed so higher temperatures may be used without burning the plastic. Additionally, by thickening the inner layer, greater heat transfer is obtained due to greater distance from the insulating intermediate layer, which is typically ethylene-vinyl alcohol (EVOH). Better heat transfer results in improved molten preform shape which results in improved product appearance. Improved product appearance results in an overall improved thermoplastic product.

The present method provides for the formation of a headed thermoplastic tube from an extruded plastic sleeve without the need for welding or fusing together of any separate components. The resultant headed tube has no seams, welds or joints. With thermoplastic laminates containing a barrier layer, the absence of such seams or joints is especially useful since there is a continuous barrier layer throughout the body portion, shoulder portion and neck portion. Complete control of the thickness and weight of the head portion of the tube can be achieved.

Also, the color of the head portion and body portion will be exactly the same, and the decorative features of the body portion, such as stripes or windows can be carried through and incorporated in the head portion of the resultant tube.

Control is provided by rotating or spinning the sleeve while heating the inside to get a molten preform with uniform heat distribution. Spinning gives the manufacturer the ability to work with larger diameter tubes without the disadvantage of the tube collapsing on itself because of the stresses on the larger diameter tubes. This control cannot be achieved by the methods of the prior art.

While there has been illustrated and described several embodiments of the present invention, it will be apparent that various changes and modifications thereof will occur to those skilled in the art. It is intended in the appended claims to cover all such changes and modifications that fall within the true spirit and scope of the present invention.

What is claimed is:

1. In a method of forming a headed thermoplastic tube from a longitudinally stretched, extruded thermoplastic sleeve having a continuous wall with inner and outer wall surfaces by positioning a longitudinally stretched, extruded thermoplastic sleeve over a forming mandrel, having a head forming end, with an exposed portion of said longitudinally stretched, extruded thermoplastic sleeve having an open end extending beyond said head forming end, the improvement comprising the steps of:
disposing the longitudinal axis of the forming mandrel in horizontal orientation;
rotating said forming mandrel about said axis;
heating the inner wall surface of said exposed portion of said longitudinally stretched, extruded thermoplastic sleeve during said rotating by a heat source so that the shape of the exposed portion is controlled and the exposed portion heats uniformly, wherein the heated exposed portion shrinks and thickens to draw the heated exposed portion into a bullet-shaped exposed portion;
stopping the rotating of said forming mandrel; and
pressing the bullet-shaped exposed portion with sufficient force into a mold cavity to form a head on said thermoplastic sleeve from the bullet-shaped exposed portion to thereby form said headed thermoplastic tube.

2. The method according to claim 1, wherein said forming mandrel is rotated at a speed in a range of 30 to 90 rpm.

3. The method according to claim 1, wherein said heating of said inner wall surface is within a temperature range of 660° F. to 863° F.

4. The method according to claim 1, wherein said longitudinally stretched, extruded thermoplastic sleeve is multi-layered and has an inner layer of a thickness 1.5 to 3 times greater than an outer layer thickness.

5. The method according to claim 1, wherein said longitudinally stretched, extruded thermoplastic sleeve is multi-layered and has an inner layer of a thickness 2 times greater than an outer layer thickness.

6. In a method of forming a headed thermoplastic tube from a longitudinally stretched, extruded thermoplastic sleeve having a continuous wall with inner and outer wall surfaces by positioning a longitudinally stretched, extruded thermoplastic sleeve over a forming mandrel, having an orifice forming pin and a head forming end, with an exposed portion of said longitudinally stretched, extruded thermoplastic sleeve having an open end extending beyond said head forming end, the improvement comprising the steps of:
disposing the longitudinal axis of the forming mandrel in horizontal orientation;
extending said orifice forming pin beyond the head forming end of said forming mandrel;
rotating said forming mandrel about said axis;
heating the inner wall surface of said exposed portion of said longitudinally stretched, extruded thermoplastic sleeve during said rotating by a heat source so that the shape of the exposed portion is controlled and the exposed portion heats uniformly, wherein the heated exposed portion shrinks and thickens to draw the heated exposed portion into a bullet-shaped exposed portion;
stopping the rotating of said forming mandrel;
pressing the bullet-shaped exposed portion with sufficient force into a mold cavity which retracts said orifice forming pin of said forming mandrel thereby forming a head having an orifice on said thermoplastic sleeve from the bullet-shaped exposed portion to thereby create said headed thermoplastic tube with a head having an orifice; and
removing said forming mandrel and said thermoplastic tube positioned over said forming mandrel from said mold cavity.

7. The method according to claim 6, wherein said forming mandrel is rotated at a speed in a range of 30 to 90 rpm.

8. The method according to claim 6, wherein said heating of said inner wall surface is within a temperature range of 660° F. to 863° F.

9. In a method of forming a headed thermoplastic tube from a longitudinally stretched, extruded thermoplastic sleeve having a continuous wall with inner and outer wall surfaces by positioning a longitudinally stretched, extruded thermoplastic sleeve over a forming mandrel, having a head forming end, with an exposed portion of said longitudinally stretched, extruded thermoplastic sleeve having an open end extending beyond said head forming end, the improvement comprising the steps of:
positioning the longitudinal axis of said forming mandrel horizontally;
rotating said forming mandrel about said axis at a speed in the range of 30 rpm to 90 rpm;
heating the inner wall surface of said exposed portion of said longitudinally stretched, extruded thermoplastic sleeve to a temperature in a range of 660° F. to 863° F. during said rotating by a heat source so that the shape of the exposed portion is controlled and the exposed portion heats uniformly, wherein the heated exposed portion shrinks and thickens to draw the heated exposed portion into a bullet-shaped exposed portion;
stopping the rotating of said forming mandrel; and
pressing the bullet-shaped exposed portion with sufficient force into a mold cavity to form a head on said thermoplastic sleeve from the bullet-shaped exposed portion to thereby form said headed thermoplastic tube.

* * * * *